United States Patent [19]

Grätz

[11] Patent Number: 5,372,010

[45] Date of Patent: Dec. 13, 1994

[54] METHOD AND ARRANGEMENT FOR THE COMPRESSION OF GAS

[75] Inventor: Günther Grätz, Kaarst, Germany

[73] Assignee: Mannesmann Aktiengesellschaft, Dusseldorf, Germany

[21] Appl. No.: 88,986

[22] Filed: Jul. 8, 1993

[30] Foreign Application Priority Data

Jul. 10, 1992 [DE] Germany .................. 4223160

[51] Int. Cl.$^5$ .................................................. F25B 9/00
[52] U.S. Cl. .................................. 62/87; 62/260; 62/402; 165/45
[58] Field of Search ............. 62/50.1, 87, 260, 402; 48/191; 165/45

[56] References Cited

U.S. PATENT DOCUMENTS

| | | | |
|---|---|---|---|
| 2,875,589 | 3/1959 | Horn | 62/87 |
| 2,958,205 | 11/1960 | McConkey | 62/48.2 |
| 3,002,362 | 10/1961 | Morrison | 62/87 |
| 3,118,286 | 1/1964 | Schroeder | 62/87 |
| 3,802,213 | 4/1974 | Ooka | 62/50.1 |
| 3,846,994 | 11/1974 | Reid | 62/87 |
| 4,192,655 | 3/1980 | von Linde | 62/87 |
| 4,350,019 | 9/1982 | Chocas | 62/87 |

*Primary Examiner*—Ronald C. Capossela
*Attorney, Agent, or Firm*—Cohen, Pontani, Lieberman, Pavane

[57] ABSTRACT

A method and an arrangement for compressing gas in a compressor station for a gas pipeline, especially in areas of permanent frost, wherein the gas is supplied in the gas pipeline to the compressor station at an entry pressure and the gas is returned to the pipeline for further transportation in the pipeline at a desired exit temperature and at an exit pressure which is higher than the entry pressure. The gas is initially compressed at least during individual time intervals to an excess pressure which is substantially higher than the desired exit pressure. The compressed gas is then cooled by heat exchange to a temperature above the desired exit temperature. Finally, the gas is further cooled to the desired exit temperature by expanding the gas from the excess pressure to the exit pressure.

12 Claims, 2 Drawing Sheets

METHOD AND ARRANGEMENT FOR THE COMPRESSION OF GAS

BACKGROUND OF THE INVENTION

1. Field of the Invention

The present invention relates to a method of compressing gas in a compressor station for a gas pipe line, particularly in permanent frost areas. The method includes compressing the gas delivered in the pipeline with an entry pressure in a compression procedure to a higher pressure, subsequently cooling the gas by a heat exchange and again feeding the gas for the further transportation to the pipeline with a lower exit temperature, particularly an exit temperature of at most 0° C., and with an increased exit pressure as compared to the entry pressure.

The present invention also relates to an arrangement for carrying out the method.

2. Description of the Related Art

Natural gas is transported today in very large quantities frequently over distances of several thousand kilometers in large gas pipelines to the centers of consumption. For example, such long-distance gas pipelines may have a diameter of 56 inches and may be operated with gas pressures of 75 bar or even up to 100 bar, in order to achieve a transportation capacity which is as large as possible. Because of the unavoidable pressure loss along the gas pipelines, the compressor stations must be provided at certain intervals for increasing the gas pressure back to the nominal pressure. As a rule, the compressors used for this purpose, usually turbo compressors, are driven by gas turbines which use a portion of the transported natural gas as fuel. A very large portion of the known natural gas reserves are located in so-called permanent frost areas, i.e., in areas in which the ground thaws during the summer months only to a depth of about 80 to 100 cm and remains otherwise permanently frozen. The gas pipelines are usually placed at a depth in the ground where permanent frost prevails. Since the soil frequently becomes very soft in the thawed state, it must be ensured that the gas pipeline does not result in thawing of the ground because the pipeline would otherwise at least at certain locations sink lower and lead to mechanical stresses in the pipe wall which may lead to pipe ruptures. Heating of the soil is a possibility because the compression of the gas in the compressor inevitably also results in a temperature increase. Therefore, the gas compressed to nominal pressure is conventionally cooled before being returned into the pipeline, wherein a maximum temperature of approximately 0° C. must be maintained. If possible, a temperature of −5° C. is desirable.

Because of the low outside temperatures substantially below 0° C., the required cooling poses no problems during the winter months and can be easily carried out by gas/air coolers. However, during the transition periods and particularly in the summer months, during which maximum day temperatures of 15° to 20° C. are possible, the gas coolers are inevitably no longer sufficient. For this reason, special re-cooling plants with separate cooling cycle, i.e., refrigerating or cooling machines in which propane in particular is used as a cooling agent, are used in such compressor stations during the warm weather periods.

The use of re-cooling plants of the conventional type poses several problems. The re-cooling plants are very expensive and constitute a large portion of the total investment for a compressor station. In addition, there is the fact that the plant is completely unused during the major portion of a year, i.e., for eight months. In addition, there is a safety problem with respect to possible leakages because the propane as cooling agent is not only easily flammable, but is also heavier than air and, therefore, has a reduced volatility, so that the explosion risk is substantially increased.

SUMMARY OF THE INVENTION

Therefore, it is the primary object of the present invention to propose a method of the above-described type and an arrangement for carrying out the method in which the required investments and operation risk are substantially reduced.

In accordance with the present invention, the method of the above-described type includes the steps of compressing the gas at least during individual intervals to a substantially higher pressure (excess pressure) than the desired exit pressure, cooling the compressed gas by the heat exchange to a temperature above the exit temperature, and obtaining the further cooling to the desired exit temperature by expanding the gas from the excess pressure to the desired exit pressure.

A compressor station for a gas pipeline for carrying out the above-described method includes at least one compressor for compressing gas, at least one heat exchanger for cooling compressed gas, additionally valve-controlled pipelines for connecting the compressor and the heat exchanger to one another and to the gas pipeline, as well as control units for controlling the compressor and the valves. In accordance with the present invention, an electronic control is provided which operates in such a way that at least one compressor carries out a compression of the gas to an excess pressure which is substantially above the desired exit pressure. In addition, an expanding unit is provided for expanding the compressed gas, wherein the electronic control is operated in such a way that the expansion takes place until the desired exit pressure is reached.

The present invention starts from the fact that it is known to carry out the compression of a gas supplied at an entry pressure below the nominal pressure (rated pressure of the gas pipeline) to an increased pressure, wherein the compression can be carried out in a single stage or in multiple stages in compressors which are connected in series. Between the compressor stages and particularly after the last compressor stage, cooling by heat exchange takes place (usually air/gas heat exchange), in order to reach the required lower exit temperature of at most 0° C., preferably −5° C., for the re-entry of the compressed gas into the gas pipeline.

During the warmer period of the year, in which the use of re-cooling units was necessary in the past for ensuring the required exit temperature, the present invention provides for a different type of cooling. The present invention utilizes the known physical effect according to which a compressed gas is inevitably cooled when expanded to a lower pressure, either by throttling or with the simultaneous performance of work. In order to ensure the required exit pressure or nominal pressure at the exit of the compressor station, the present invention provides that the gas to be transported is compressed to an excess pressure which is substantially above the exit pressure, for example, 10 to 50 bar above the exit pressure, to carry out at the end of the single-stage or multiple-stage compression a cooling by heat exchange, particularly by air/gas heat exchange, and subsequently to expand the compressed gas to the desired exit pressure. The excess pressure is selected in such a way that, taking into consideration the extent by which the gas compressed to excess pressure can be cooled by heat exchange, cooling during expansion is sufficient for obtaining a temperature reduction at least to the desired exit temperature of the gas for the re-entry into the gas pipeline or transportation. These parameters can be easily computed with the aid of the existing limiting or boundary conditions.

The expansion can be carried out in a simple manner, for example, by means of a valve. However, a more significant cooling effect can be achieved if the compressed gas additionally performs work during the expansion, as this is possible in an expansion turbine. This embodiment of the invention is particularly recommended for the operation during the summer months, and this embodiment provides the additional advantage that the recovered mechanical energy can be utilized for providing a portion of the drive energy for the compression of the gas to the intended excess pressure.

A particularly advantageous embodiment of the present invention provides that the compression to the excess pressure is carried out in a total of three stages, wherein a predominant portion of the compression takes place in two successive primary, compression stages which are equipped with machines which produce approximately the same pressure ratio. This provides the advantage that the compressors of the primary compression stages may be essentially of the same construction. Only the compressor housing of the subsequent compressor or compressors must be dimensioned for a higher pressure than the housing of the compressor or compressors of the first primary compression stage. Between the two primary compression stages, the gas heated in the first primary compression stage is cooled preferably by air/gas heat exchange. When the compressed gas leaves the second primary compression stage, the gas has not yet reached the desired excess pressure. The desired excess pressure is reached in an additional compression stage which includes a booster compressor. Subsequently, the gas is again cooled, preferably by means of an air/gas heat exchange. An expansion with simultaneous performance of work is then carried out in an expansion turbine. The latter is coupled, for example, mechanically to the booster compressor of the additional compression stage and is the sole drive means for the booster compressor, so that a significant portion of the total drive energy required for producing the excess pressure can be recovered and is not lost.

The above-described manner of carrying out the method in two primary compression stages with compressors having approximately the same pressure ratio provides the significant advantage that the compressors used in the stages can be completely exchanged for one another, as long as they are operated with the maximum permissible pressure of the first primary compression stage.

The possibility of exchanging the compressors is of particular interest because the requirements with respect to the rate of flow through the pipeline, i.e., the required nominal pressure in the pipeline, on the one hand, and the environmental conditions for cooling by heat exchange, on the other hand, are subject to substantial changes during the course of the year. During the cold season, during which the cooling can be ensured without problems by heat exchange alone, the pressure achievable with one primary compression stage (i.e. single-stage) is already sufficient, so that cooling by expansion from an even higher excess pressure becomes superfluous. On the other hand, during the warmer season, the insufficient cooling by heat exchange means that the amount of gas required is usually lower, for example, 10 to 15% lower, than in the cold season, so that it is possible to operate with a pipeline pressure which is lower as compared during the winter season. Consequently, the actually required excess pressure can be selected lower, and, in order to still achieve the required temperature level, the expansion can be carried out instead to a nominal pressure which is lower than the nominal pressure during the cold season. Because of these conditions, not only the operation in the warm season can be carried out inexpensively and with a comparatively small quantity of energy; there are also advantages with respect to the operation during the cold season because the compressors of the second primary compression stage can be operated parallel with the compressors of the first primary compression stage, i.e., under the same pressure conditions. For this purpose, the connecting pipelines to the inlets and outlets of the compressors are switched to parallel operation by means of a suitable valve control. Since several compressors of the same type already operate in parallel in each primary compression stage, and since all compressors never have to be used even during peak load periods, in addition to already existing stand-by machines, additional compressors are available which can be used as needed during breakdowns or when maintenance has to be performed. As compared to the prior art in which special re-cooling units are used which can only be used efficiently during the warm season, i.e., in summer operation, the present invention provides an altogether better possibility of using the principal units of the compressor stations throughout the entire year.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described a preferred embodiment of the invention.

DETAILED DESCRIPTION OF THE PREFERRED EMBODIMENTS

Figure 1:
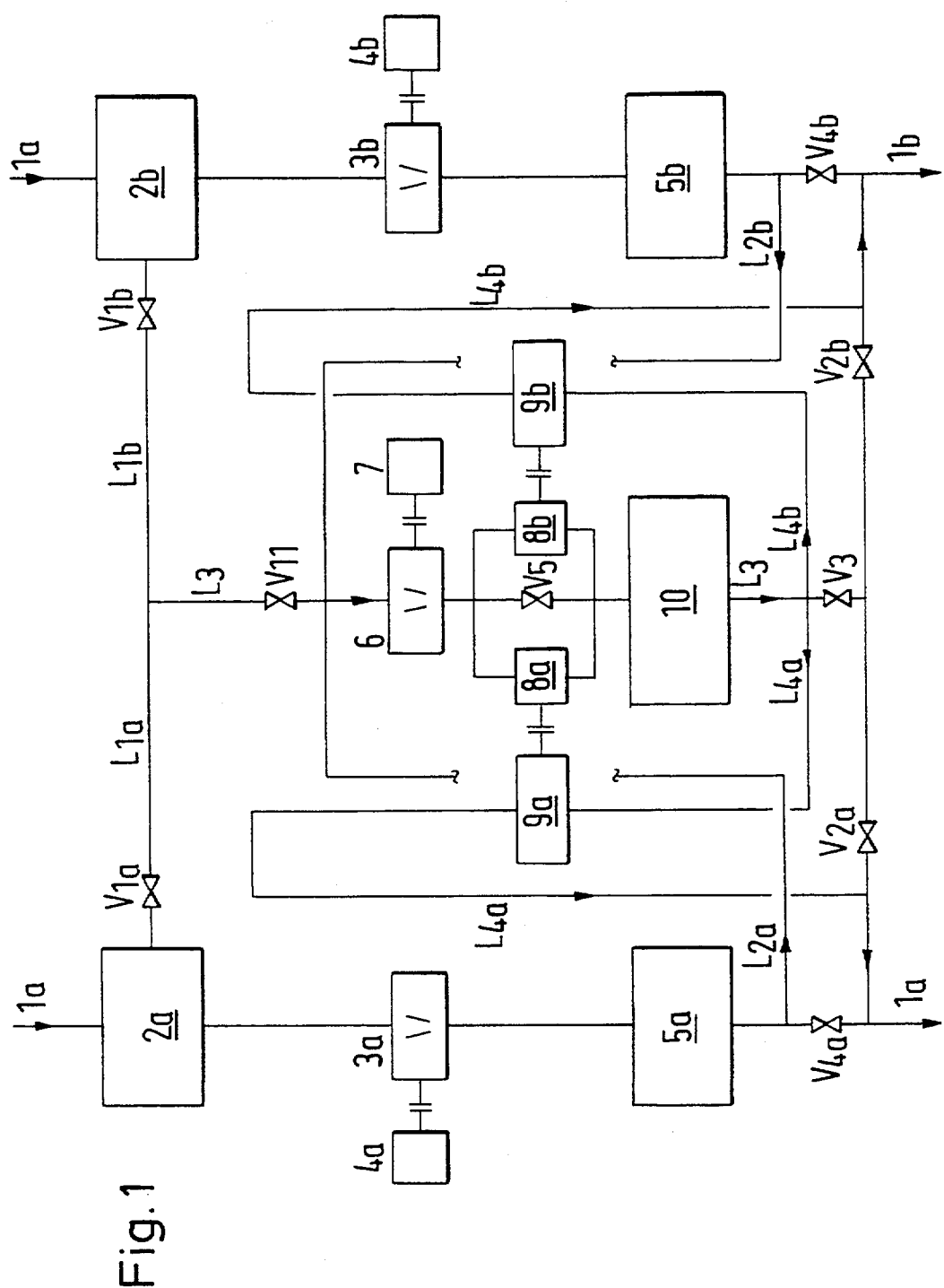
FIG. 1 is a schematic diagram showing an embodiment of a compressor station according to the present invention during summer operation.
Figure 2:
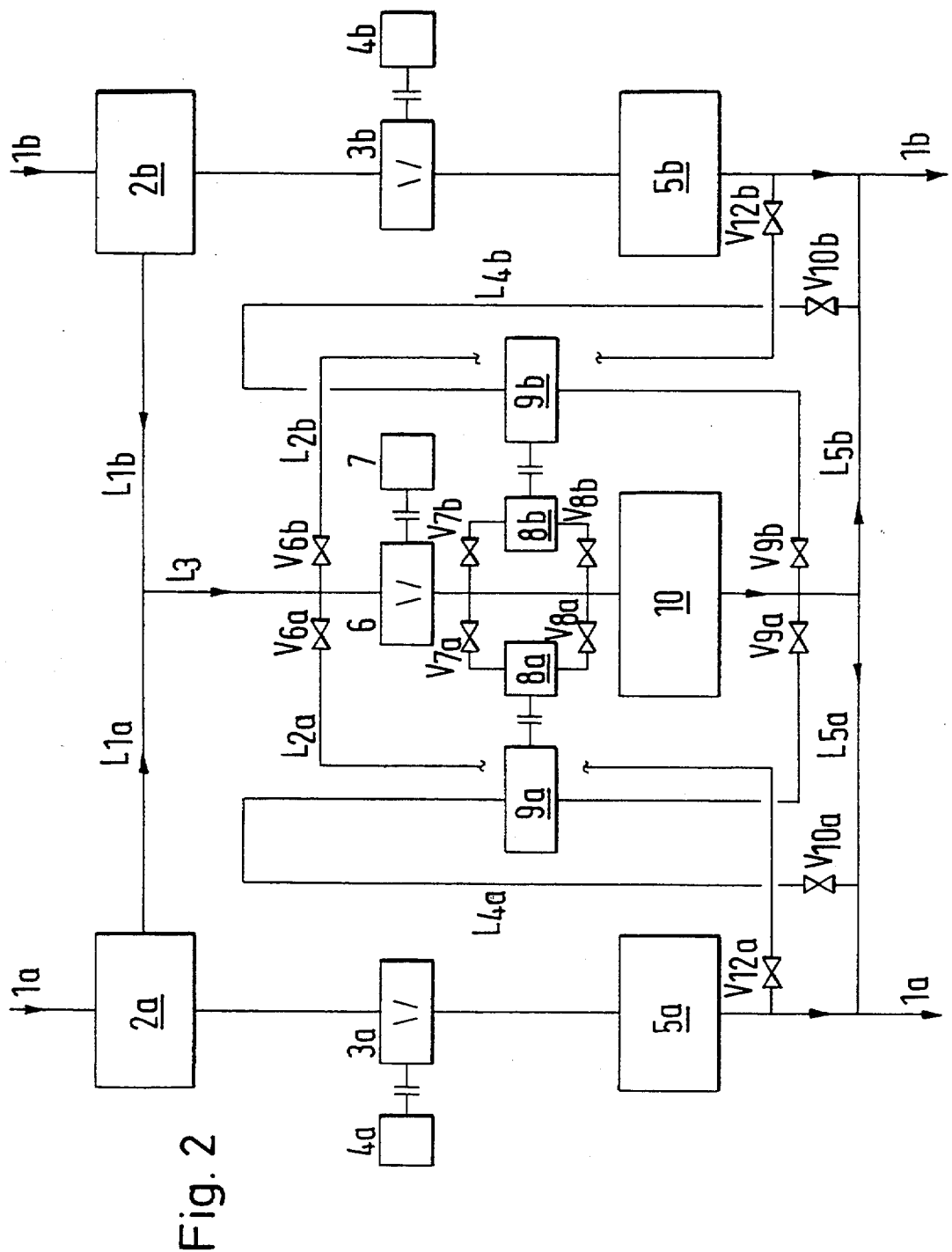
FIG. 2 shows the compressor station of FIG. 1 during winter operation.

In FIGS. 1 and 2 of the drawing, those connecting pipelines through which the gas flows during the respective type of operation are shown in thick lines and the pipelines which are closed off by valves are shown in thin lines. In the illustrated embodiment, the gas pipeline has two parallel line strands $1a$, $1b$. The pressure in the pipeline which may have dropped at the entry into the compressor station to, for example, 50 bar, is to be raised again to reach a nominal pressure of, for example, 75 or 100 bar, at the exit of the compressor station. The gas pipeline $1a$, $1b$ initially leads into a purifying unit $2a$ and $2b$, respectively, which may be constructed as cyclone separators with or without filters and serve to separate undesirable impurities, such as moisture, dust, etc. from the gas. Subsequently, the gas is conducted into the first primary compression stage with the compressors $3a$ and $3b$ which are driven by gas turbines $4a$ and $4b$, respectively. The fuel for driving the gas turbines $4a$ and $4b$ is removed from the gas line $1a$ or $1b$, respectively, in a manner not illustrated in detail. The compression taking place in the compressors $3a$ and $3b$ increases the temperature of the gas. This temperature is again reduced by a subsequently arranged heat exchanger $5a$, $5b$ which is preferably constructed as an air/gas heat exchanger.

The gas cannot yet be returned to the pipeline $1a$, $1b$ because cooling by the heat exchange cannot be carried out to a temperature which is low enough. This is because the external temperatures of the air are too high during the summer operation and, consequently, the temperatures of the cooling agent are too high. Since the valves $V_{4a}$ and $V_{4b}$, in the gas pipeline $1a$, $1b$ are closed, the compressed gas flows into the connecting pipeline $L_{2a}$, $L_{2b}$ and is conducted into a second primary compression stage with the compressor 6. For this purpose, the connecting pipelines $L_{2a}$ and $L_{2b}$ lead into a common supply line (line $L_3$) of the compressor 6. This line $L_3$ can also be connected directly to the purifying units $2a$, $2b$ through the connecting pipelines $L_{1a}$ and $L_{1b}$. However, during summer operation, these connections are locked by the valves $V_{11}$ and $V_{1a}$, $V_{1b}$. The compressor 6 is driven by a gas turbine 6 which, as is the case in the gas turbines $4a$, $4b$ of the first primary compression stage, removes a portion of the gas from the gas pipeline $1a$ or $1b$ to be used as fuel. Immediately following the compressor 6, the line $L_3$ branches and leads to an additional compression stage with compressors $8a$, $8b$ (booster compressors) which are connected in parallel and raise the pressure of the gas to a previously determined excess pressure. Following the additional compressors $8a$, $8b$, the compressed gas which has been heated as a result is again conducted to a heat exchanger 10 (preferably air/gas heat exchanger) for cooling the gas to a temperature corresponding to the ambient temperature. The line $L_3$ can also be switched in such a way that a direct connection between the compressor 6 and the heat exchanger 10 is obtained. However, in the case of summer operation shown in FIG. 1, this direct connection is locked by a valve $V_5$. After leaving the heat exchanger 10, the line $L_3$ branches into supply pipelines $L_{4a}$ and $L_{4a}$ which lead to expansion turbines $9a$ and $9b$. In the expansion turbines $9a$ and $9b$, the gas is expanded from the excess pressure to the nominal pressure of the pipeline $1a$, $1b$ while simultaneously performing work.

As a result, the gas is cooled to such an extent that it can be returned behind the closed valves $V_{4a}$ and $V_{4b}$ at the required nominal pressure and the desired nominal temperature to the pipeline $1a$ and $1b$. In the illustrated embodiment, the expansion turbines $9a$ and $9b$ are coupled to the additional compressors $8a$ and $8b$, and they meet the drive energy demand of these compressors. The heat exchanger 10, as is the case in the heat exchangers $5a$, $5b$, is constructed as a gas/air cooler, can also be connected directly through the pipelines $L_{5a}$ and $L_{5b}$ to the two pipeline strands $1a$, $1b$. However, during summer operation, this connection is closed by the valves $V_3$ and $V_{2a}$, and $V_{2b}$.

With respect to the actuation of the individual valves and the control of the compressors and the turbines, the entire compressor station is controlled by an electronic control system, not illustrated in FIGS. 1 and 2.

In accordance with a useful feature of the present invention, the compressor station would not be constructed in the manner schematically illustrated in FIG. 1 for simplicity stake. Rather, instead of single compressors, each of the two primary compression stages would have several compressors connected in parallel. For example, each pipeline strand $1a$, $1b$ would have in the first primary compression stage three primary compressors $3a$ and $3b$ with a stand-by machine, i.e., altogether $2\times(3+1)$ primary compressors $3a$, $3b$ (in a 56 inch double gas line at 75 bar operating pressure with 16 MW units and at 100 bar operating pressure with 25 MW units), wherein corresponding gas turbines $4a$, $4b$ are provided as drive units. A smaller number of primary compressors 6 (connected in parallel) is sufficient in the second primary compression stage because the pressure increase effected up to then also results in a corresponding volume reduction of the compressed gas. For example, in view of the above-mentioned equipment of the first primary compression stage, it would be useful to have four primary compressors 6 and an additional stand-by machine, i.e., altogether five compressors 6.

Instead of the expansion turbines $9a$, $9b$, it is also possible to use simple throttling devices for pressure reduction. However, this would mean that the temperature decrease of the gas resulting from the pressure reduction would be substantially less, i.e., for obtaining the same final temperature, under otherwise the same conditions the excess pressure would have to be even higher. In addition, no drive energy could be recovered and, therefore, the specific energy consumption of the compressor station would be accordingly higher. Therefore, the use of expansion turbines is preferred. However, if the expansion turbines are not used, it is apparent that the excess pressure can be produced in the transition phase only in two stages. As is the case in the three-stage compression using two primary compression stages and an additional compression stage, it is preferred to provide compressors $3a$, $3b$ and 6 which have approximately the same pressure ratio in order to make it possible to use compressors which are as much as possible of the same construction.

When the outside temperatures (winter operation) are sufficiently low, cooling of the gas by pressure expansion is no longer necessary. As FIG. 2 shows, the present invention provides that during the cold season the compressor station is operated differently by switching the valves to essentially obtain a parallel operation of the compressors. The valves $V_{1a}$, $V_{1b}$, $V_{2a}$, $V_{2b}$, $V_3$, $V_{4a}$, $V_{4b}$, $V_5$, are all open and, in order to simplify FIG. 2, are not shown in FIG. 2.

After flowing through the heat exchangers $5a$, $5b$ the gas compressed in the primary compressors $3a$, $3b$ to the nominal pressure of, for example, 75 bar or 100 bar, can already be supplied at a temperature of below 0° C. to the gas pipeline $1a$, $1b$. The compressors $3a$, $3b$ can produce the required throughput quantity together with additional units of the compressor 6 because the latter, contrary to the summer operation, can produce a portion of the required flow rate since they are connected in parallel. For this purpose, the gas having a low entry pressure reaches through the pipelines $L_{1a}$, $L_{1b}$, $L_3$ the compressor or compressors 6 in which the gas is compressed in one compression step to the required nominal pressure. The additional compressors 8a, 8b are switched off during winter operation by closing the valves $V_{7a}$, $V_{7b}$, $V_{8a}$, $V_{8b}$. As is the case in the primary compressors 3a, 3b, the compressed, heated gas is initially conducted for cooling to the required exit temperature into the heat exchanger 10 and is then returned through the lines 5a, 5b into the gas pipeline 1a, 1b. The connecting pipelines $L_{2a}$, $L_{2b}$ and $L_{4a}$, $L_{4b}$ are closed by the valves $V_{6a}$, $V_{6b}$, $V_{12a}$, $V_{12b}$ and $V_{9a}$, $V_{9b}$, $V_{10a}$, $V_{10b}$ which are not illustrated in FIG. 1. For example, during normal winter operation, 2×3 compressors 3a, 3b of the first primary compression stage and two parallel compressors of the second primary compression stage may be in continuous operation. In addition, a stand-by machine is available at each pipeline strand 1a, 1b and even three stand-by machines are available in the parallel second primary compression stage. These stand-by machines can be put into operation in case of interruptions or for the purposes of maintenance without reducing the throughput quantity. The above-described configuration is particularly useful for double-strand long-distance pipelines having a diameter of 56 inches and operated at a pressure of 100 bar with the use of 25 MW turbine sets or at 75 bar with the use of 16 MW turbine sets.

The effectiveness of the method according to the present invention under the conditions of summer operation (about three to four months of the year) becomes clear from the following example which is described with respect to the configuration of the arrangement shown in FIG. 1.

It is assumed that natural gas enters the purifying units 2a, 2b at the pipeline beginning at a production source from a separation plant with a temperature of approximately 15° C. and a pressure of approximately 50 bar. The nominal entry temperature into the pipeline 1a, 1b for further transportation is at most 0° C. The required pipeline pressure results as a function of the required throughput quantity. When the natural gas is compressed in the primary compressors 3a, 3b, it is heated to approximately 60° to 80° C. (corresponding to the pressure ratio in the compressor) and is then cooled to 25° C. in the air/gas heat exchangers 5a, 5b. The heat exchangers 5a, 5b and the pipelines within the compressor station result in a pressure loss of about 2 bar. A further compression in the subsequent primary compressor 6 produces an intermediate pressure, which causes the temperature of the natural gas to increase to approximately 50° to 60° C. The subsequent additional compressors 8a, 8b increase the pressure further to the desired final pressure or excess pressure which causes a temperature rise to about 80° C. Immediately subsequently, the compressed gas is again cooled in the heat exchanger 10 to a temperature of about 25° C. and the gas is then expanded in the expansion turbines 8a, 8b to the pipeline pressure, for example, 75 bar. As a result, the compressed natural gas has a temperature of approximately $-5°$ C. to $\pm 0°$ C. when entering the gas pipeline. The respective expansion pressure is determined by the ambient temperature and the throughput quantity through the line.

Because of the recovery of drive energy in the expansion turbines, the quantity of energy required for such a compressor station is not higher than in a comparable compressor station using conventional re-cooling technology on the basis of a closed propane cooling cycle. The important aspect is the fact that the investment required for a plant according to the present invention is substantially lower, approximately by 40 to 45 % percent than for a plant utilizing conventional re-cooling technology. This not only results in an increase of the availability of the overall plant, but also in a reduction of the risk of accidents due to the fact that re-cooling units are not present.

The invention is not limited by the embodiments described above which are presented as examples only but can be modified in various ways within the scope of protection defined by the appended patent claims.

I claim:

1. A method of compressing gas in a compressor station for a gas pipeline, especially in areas of permanent frost, wherein the gas is supplied in the gas pipeline to the compressor station at an entry pressure and the gas is returned to the pipeline for further transportation in the pipeline at a desired exit temperature and at an exit pressure which is higher than the entry pressure, the method comprising the steps of: compressing the gas at least during individual time intervals to an excess pressure which is substantially higher than the exit pressure, the compressing taking place in three stages comprising two primary compression stages and an additional compression stage, wherein the two primary compression stages have approximately the same pressure ratio; cooling the compressed gas by a heat exchange to a temperature above the exit temperature, cooling by heat exchange being carried out between the two primary compression stages and behind the additional compression stage; further cooling the gas to the desired exit temperature by expanding the gas from the excess pressure to the exit pressure, the step of expanding the gas being carried out during the summer season on an expanding turbine unit, wherein the turbine unit produces mechanical energy; and using the mechanical energy as a portion of the drive energy required for carrying out the step of compressing the gas to the excess pressure.

2. The method according to claim 1, comprising carrying out the step of expanding the gas by a throttling means during a transition period between the summer season and the winter season.

3. The method according to claim 1, comprising using the mechanical energy for driving the additional compression stage.

4. The method according to claim 1, wherein the two primary compression stages comprise a first compression stage and a second compression stage each having a plurality of compressor units, the method further comprising in the winter season utilizing at least a portion of the compressor units of the second compression stage in parallel operation with the compressor units of the first compression stage for producing the exit pressure.

5. The method according to claim 1, wherein the desired exit temperature is about 0° C.

6. The method according to claim 1, wherein the desired exit temperature is about $-5°$ C.

7. The method according to claim 1, comprising utilizing a gas/air heat exchange for carrying out the step of cooling the gas by heat exchange.

8. A compressor station for compressing gas conducted through a gas pipeline, especially in areas of permanent frost, wherein the gas is supplied in the gas pipeline to the compressor station at an entry pressure and the gas is returned to the gas pipeline for further transportation in the gas pipeline at a desired exit temperature and at an exit pressure which is higher than the entry pressure, the compressor station comprising: at least two primary compressors having approximately the same pressure ratio and being connected in series, and an additional compressor following the two primary compressors, the compressors being provided for compressing the gas to an excess pressure which is significantly above the exit pressure; an expansion unit for expanding the compressed gas from the excess pressure to the exit pressure and cooling the gas to the desired exit temperature, the expansion unit comprising at least one expansion turbine which is coupled to the at least one additional compressor; a plurality of heat exchangers, a heat exchanger being provided between the two primary compressors and between the additional compressor and the expansion unit; and an electronic control means for controlling valves in pipelines connecting the compressors to each other and connecting the heat exchangers to each other and to the gas pipeline.

9. The compressor station according to claim 8, wherein the expansion unit comprises at least one throttling unit.

10. The compressor station according to claim 8, wherein the additional compressor comprises booster compressors.

11. The compressor station according to claim 8, comprising means for switching the primary compressors to parallel operation by means of valves.

12. The compressor station according to claim 8, wherein the expansion turbine is coupled to the additional compressor one of mechanically and mechanically.

* * * * *